(12) United States Patent
Ohtsuka

(10) Patent No.: US 10,327,070 B2
(45) Date of Patent: Jun. 18, 2019

(54) SOUND PICKUP DEVICE AND IMAGING DEVICE USING SAME

(71) Applicant: Panasonic Intellectual Property Management Co., Ltd., Osaka (JP)

(72) Inventor: Yoshio Ohtsuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/713,619

(22) Filed: Sep. 23, 2017

(65) Prior Publication Data

US 2018/0213323 A1  Jul. 26, 2018

(30) Foreign Application Priority Data

Jan. 24, 2017  (JP) .................. 2017-009906
Jun. 8, 2017  (JP) .................. 2017-113101

(51) Int. Cl.

| H04R 3/02 | (2006.01) |
|---|---|
| H04R 1/02 | (2006.01) |
| G10K 11/00 | (2006.01) |
| H04R 1/10 | (2006.01) |
| G03B 31/00 | (2006.01) |

(Continued)

(52) U.S. Cl.
CPC .............. *H04R 3/02* (2013.01); *G03B 31/00* (2013.01); *G10K 11/002* (2013.01); *H04R 1/028* (2013.01); *H04R 1/1083* (2013.01); *G03B 17/02* (2013.01); *H04N 5/2252* (2013.01); *H04R 3/005* (2013.01); *H04R 2201/029* (2013.01); *H04R 2410/05* (2013.01); *H04R 2499/11* (2013.01)

(58) Field of Classification Search
CPC . H04R 3/02; H04R 1/028; H04R 1/08; H04R 1/406; H04R 1/38; H04R 1/342; H04R 1/083; H04R 1/086; H04R 1/04; H04R 2410/05; H04R 2499/11; H04R 2499/13; G10K 11/002; H04M 1/03; B60R 11/0247

USPC .................... 381/91, 355, 361, 365, 368
See application file for complete search history.

(56) References Cited

U.S. PATENT DOCUMENTS 8,867,773 B2 * 10/2014 Kimura .................. H04N 5/225
 381/359
2003/0161484 A1  8/2003 Kanamori et al.

(Continued)

FOREIGN PATENT DOCUMENTS

JP  2000-004494 A  1/2000
JP  2006-352342 A  12/2006

OTHER PUBLICATIONS

The Extended European Search Report dated Feb. 13, 2018 for the related European Patent Application No. 17187156.9.

*Primary Examiner* — Ahmad F. Matar
*Assistant Examiner* — Sabrina Diaz
(74) *Attorney, Agent, or Firm* — Renner Otto Boisselle & Sklar, LLP

(57) ABSTRACT

A sound pickup device includes a housing having a porous exterior surface, main microphones, a reference microphone disposed near the main microphones, a first support member, a second support member, a first blocking member that blocks between the inside of the housing and the insides of the main microphones, a second blocking member that blocks between the outside of housing and the inside of the reference microphone, and a third blocking member that blocks between the inside of the housing and the inside of the reference microphone.

25 Claims, 9 Drawing Sheets

(51) Int. Cl.
*H04N 5/225* (2006.01)
*H04R 3/00* (2006.01)
*G03B 17/02* (2006.01)

(56) References Cited

U.S. PATENT DOCUMENTS

| | | | |
|---|---|---|---|
| 2006/0109997 A1* | 5/2006 | Kano | H04R 1/08 381/365 |
| 2006/0139443 A1 | 6/2006 | Tatamiya | |
| 2010/0054495 A1* | 3/2010 | Harney | H04M 1/035 381/92 |
| 2014/0294217 A1* | 10/2014 | Yamaguchi | H04M 1/035 381/334 |

* cited by examiner

Sound is allowed to pass through

Sound is not allowed to pass through

FIG. 10

|  | Reference diagram | First blocking member | Second blocking member | Third blocking member |
|---|---|---|---|---|
| First exemplary embodiment | Fig. 5 | Resin case 116<br>Sponge A131<br>Sponge B132<br>Printed board 408 | Sponge D134<br>Resin case 116<br>Rubber member 113<br>Printed board 408 | Resin case 116<br>Rubber member 113 |
| Modified example | Fig. 9 | Resin case 116<br>Sponge A131<br>Sponge B132<br>Printed board 408 | Sponge D134<br>Tape 137 | Resin case 116<br>Sponge E131A<br>Sponge F132A<br>Printed board 408 |

SOUND PICKUP DEVICE AND IMAGING DEVICE USING SAME

BACKGROUND

1. Technical Field

The present disclosure relates to a sound pickup device that picks up a sound and an imaging device using the sound pickup device.

2. Description of the Related Art

Conventionally, an audio processing device having an auto level control (ALC) function for controlling input audio so that the sound has an appropriate level has been known (for example, see PTL 1).

A microphone device in PTL 1 includes a mechanism part that causes a noise at a time of operation in a device housing. This microphone device reduces mixing of a noise which is caused inside when picking up an external sound. The microphone device includes a main microphone, a noise reference microphone, an adaptive filter unit, a signal subtracting unit, a signal level comparison unit, and a filter coefficient updating control unit. The main microphone picks up an external sound that has arrived from outside the device housing. The noise reference microphone is provided inside the device housing. The adaptive filter unit receives a detection signal from the noise reference microphone, and generates a control sound signal using an updated filter coefficient. The signal subtracting unit subtracts the control sound signal of the adaptive filter unit from an output signal from the main microphone. The signal level comparison unit compares levels between an output signal from the main microphone and a detection signal of the noise reference microphone. The filter coefficient updating control unit receives a compared result of the signal level comparison unit, a subtracted result of the signal subtracting unit, and the detection signal of the noise reference microphone. When an output level of the noise reference microphone is larger than an output level of the main microphone, the filter coefficient updating control unit updates a filter coefficient of the adaptive filter unit such that the subtracted result of the signal subtracting unit becomes minimum.

With this microphone device, a signal is given from the noise reference microphone to the adaptive filter unit, thus a control sound signal is generated, and the control sound signal cancels a noise. As a result, mixing of an internal noise can be reduced when an external sound is picked up.

CITATION LIST

Patent Literature

PTL 1: Unexamined Japanese Patent Publication No. 2000-4494

SUMMARY

The present disclosure provides a sound pickup device that includes a housing having a porous exterior surface provided with a plurality of holes, a main microphone that receives sound pressure from an outside of the housing via the plurality of holes to generate a first audio signal and is disposed on an inside of the housing, a reference microphone that generates a second audio signal and is disposed near the main microphone on the inside the housing, a first support member that supports the main microphone and is disposed on the inside of the housing, a second support member that supports the reference microphone and is disposed on the inside of the housing, a first blocking member that blocks between the inside of the housing and an inside of the main microphone, a second blocking member that blocks between the outside of the housing and an inside of the reference microphone, and a third blocking member that blocks the inside of the housing and the inside of the reference microphone.

Further, the present disclosure provides an imaging device that includes an imaging unit that images a subject and generates an image signal, the sound pickup device that generates a third audio signal based on the first audio signal and the second audio signal, and a controller that records the image signal as well as the third audio signal in a predetermined recording medium.

With the sound pickup device of the present disclosure, even if the exterior surface has a porous shape, a noise included in an audio signal can be reduced when audio from an outside of an electronic device is picked up and thus an audio signal is generated.

BRIEF DESCRIPTION OF THE DRAWINGS

FIG. 10 is a diagram illustrating a list of a first blocking member to a third blocking member in a first exemplary embodiment and the modified example.

DETAILED DESCRIPTION

Development of the Disclosure

Figure 1:
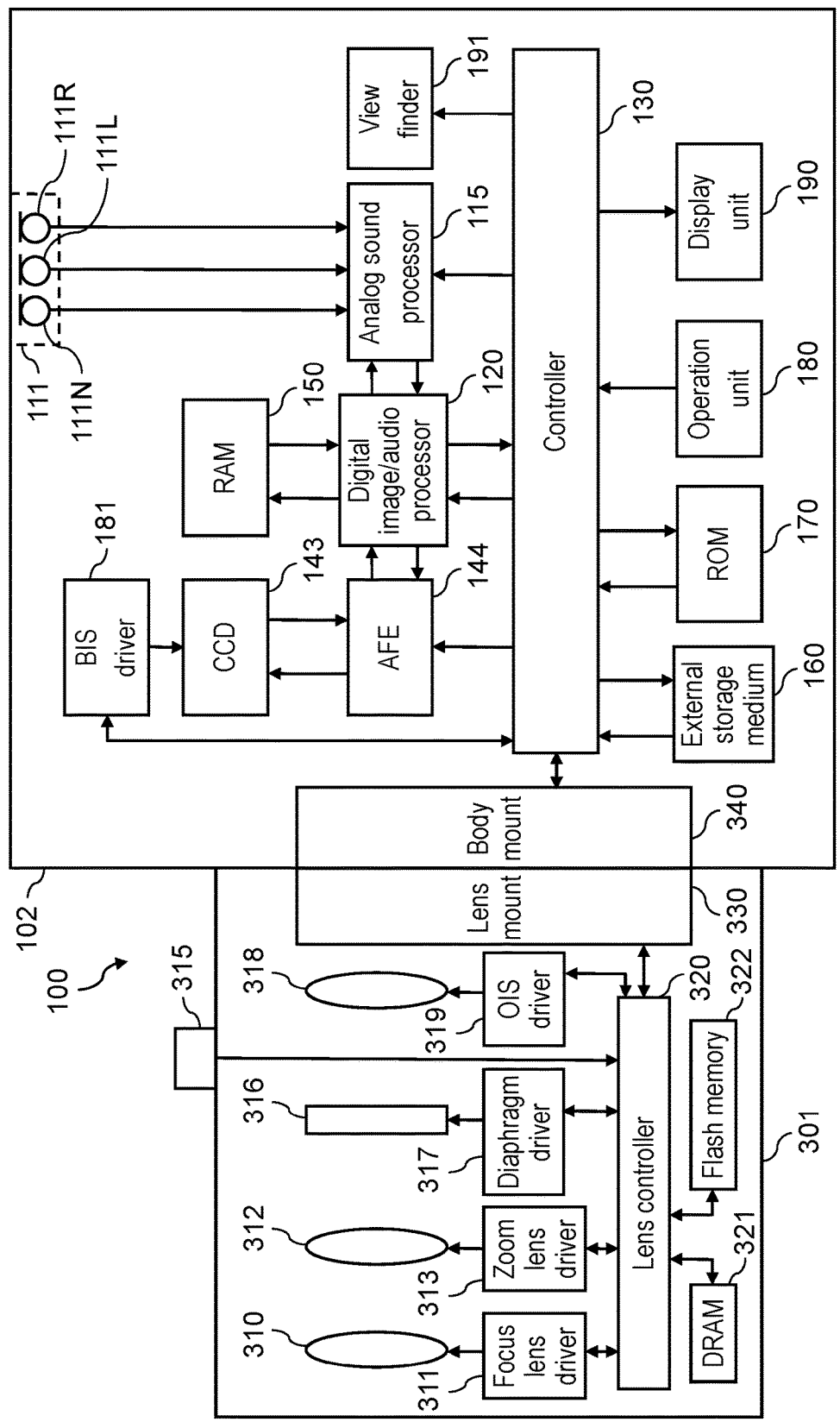
FIG. 1 is a diagram illustrating a configuration of an imaging device of the present disclosure.

The inventor of the present disclosure proposed a sound pickup device that, when picking up a sound outside an electronic device to generate an audio signal, can reduce a noise included in the audio signal in Unexamined Japanese Patent Publication No. 2016-243909. This sound pickup device is preferable for dust-proof and drip-proof digital cameras.

It is generally preferable for heightening sound quality to provide a sufficient pathway for allowing a sound to reach a main microphone to an exterior surface of an electronic device (a sound pickup device). Therefore, for an exterior surface of an electronic device, a porous member such as a punching metal plate is more desirable than a member in which small holes are provided locally on a position opposing a main microphone. When the exterior surface is made of a porous member such as a punching metal plate or when the punching metal plate does not have a horizontal face but has a slant face, a reference microphone that picks up a noise should be disposed near a main microphone and should be blocked from sound pressure from the outside of the electronic device. An object of the present disclosure is to, when audio from an outside of an electronic device is picked up and an audio signal is generated, reduce a noise included in the audio signal even if an exterior surface has a porous shape.

Hereinafter, exemplary embodiments will be described in detail with reference to the drawings appropriately. However, descriptions in more detail than necessary may be omitted. For example, a detailed description of a matter which is already well-known, or an overlapped description for a substantially identical configuration may be omitted. This is intended to prevent the following description from becoming unnecessarily redundant and to facilitate understanding by those skilled in the art.

Here, the inventor provides the attached drawings and the following description such that those skilled in the art can sufficiently understand the present disclosure, and therefore, they do not intend to restrict the subject matters of claims.

First Exemplary Embodiment

A first exemplary embodiment will now be described herein with reference to the drawings.

The first exemplary embodiment will exemplify a digital camera that can output an audio signal as one exemplary embodiment of an imaging device. A sound pickup device is incorporated into and integral with a digital camera. As resolution of a digital camera becomes higher, a taken image is influenced by camera shake more easily. Therefore, it is desirable to mount a camera shake correcting mechanism of high performance to a digital camera, but a noise is easily caused by driving of the camera shake correcting mechanism. That is, a high-resolution digital camera has a problem such that a noise is caused in the digital camera more easily. In general, it is desirable for heightening sound quality to provide a larger number of pathways for allowing a sound to reach a main microphone. That is, as an exterior surface of a digital camera, a porous exterior surface made of a punching metal plate or the like is more desirable than an exterior surface locally having small holes as sound pathways. However, when an exterior surface is made of a porous member such as a punching metal plate, it is substantially impossible to mount a main microphone and a reference microphone such that these microphones are enclosed in an exterior member (housing). That is, since it is difficult to mold a porous member by an injection molding method, it is difficult to mold a recessed portion (supporting member) that fixes a microphone integrally with a housing, and the like. Further, when a punching metal plate does not have a horizontal face but a slant face or a curved face, it is more difficult to mount a microphone such that the microphone is enclosed in an exterior member (housing).

Therefore, even when a main microphone and a reference microphone cannot be mounted to be enclosed in an exterior member, the first exemplary embodiment easily achieves a configuration such that the reference microphone can be disposed near the main microphone, and the reference microphone is blocked from sound pressure from outside.

1-1. Configuration 1-1-1. Entire Configuration

FIG. 1 is a diagram illustrating a configuration of digital camera 100 that is one exemplary embodiment of an imaging device having a sound pickup device of the present disclosure. Digital camera 100 images a subject and generates image data (still image, moving image) to record the image data on a recording medium. Digital camera 100 includes camera body 102, and interchangeable lens 301 attached to camera body 102. Digital camera 100 receives audio during taking a moving image, and can record audio data as well as the image data on the recording medium.

1-1-2. Configuration of Interchangeable Lens

Interchangeable lens 301 has an optical system including focus lens 310, correcting lens 318, and zoom lens 312. Interchangeable lens 301 further includes lens controller 320, lens mount 330, focus lens driver 311, zoom lens driver 313, diaphragm 316, diaphragm driver 317, operating ring 315, optical image stabilizer (OIS) driver 319, dynamic random access memory (DRAM) 321, flash memory 322, and the like.

Lens controller 320 controls entire operation of interchangeable lens 301. Lens controller 320 accepts an operation of operating ring 315 performed by a user, and can control zoom lens driver 313 such that zoom lens 312 is driven. Lens controller 320 can control focus lens driver 311, OIS driver 319, and diaphragm driver 317 such that focus lens 310, correcting lens 318, and diaphragm 316 are driven.

OIS driver 319 includes a drive mechanism configured with, for example, a magnet and a flat coil. OIS driver 319 controls the drive mechanism based on a detection signal of a gyro sensor that detects unsteadiness of interchangeable lens 301, and shifts correcting lens 318 in a plane vertical to an optical axis of the optical system in accordance with the unsteadiness of interchangeable lens 301. As a result, an influence of unsteadiness caused by camera shake in a picked up image can be reduced.

Lens controller 320 is connected to DRAM 321 and flash memory 322, and writes or reads information in or from these memories as necessary. Further, lens controller 320 can communicate with controller 130 via lens mount 330. Lens controller 320 may be configured with a hard-wired electronic circuit, or a microcomputer using a program, or the like.

Lens mount 330 is connected to body mount 340 of camera body 102, and mechanically and electrically connects interchangeable lens 301 and camera body 102. When interchangeable lens 301 is connected with camera body 102, lens controller 320 and controller 130 can communicate with each other. Body mount 340 can transmit a signal received from lens controller 320 via lens mount 330 to controller 130 of camera body 102.

1-1-3. Configuration of Camera Body

Camera body 102 includes charge coupled device (CCD) image sensor 143, and analog front end (AFE) 144. An exterior member (housing) of camera body 102 includes case 105 illustrated in FIG. 2A and punching metal plates 119a, 119b, and 119c illustrated in FIG. 2B.

CCD image sensor 143 picks up a subject image formed through interchangeable lens 301 to generate image information. As the image sensor, another kind of image sensor (for example, complementary metal oxide semiconductor (CMOS) image sensor) may be used.

With respect to image information read from CCD image sensor 143, AFE 144 suppresses a noise through correlated double sampling, causes an analog gain controller to perform amplification to an input range width for an analog/digital (A/D) converter, and causes the A/D converter to perform A/D conversion.

Camera body 102 further includes audio input unit 111 and analog audio processor 115. Audio input unit 111 includes two main microphones (main microphone 111R, main microphone 111L) that separately pick up main audio (audio to be recorded) from left and right directions. In the first exemplary embodiment, one example of a first direction is the left direction, and one example of a second direction is the right direction. A first main microphone is main microphone 111R, and a second main microphone is main microphone 111L.

Further, audio input unit 111 includes reference microphone 111N that acquires information about a noise inside camera body 102. That is, reference microphone 111N receives at least one of a noise caused by vibration of camera body 102 and various noises generated in camera body 102. The information acquired by reference microphone 111N is used for generating a signal for suppressing a noise included in the main audio (noise component).

Each of the microphones (main microphone 111R, main microphone 111L, and reference microphone 111N) converts the audio signal into an electric signal (analog audio signal). The analog audio signal from each of the microphones (main microphone 111R, main microphone 111L, and reference microphone 111N) is transmitted to analog audio processor 115.

Analog audio processor 115 executes a predetermined signal process on the analog audio signals. Analog audio processor 115 converts the processed analog audio signals into digital audio signals through the A/D converter, and outputs the digital audio signals to digital image/audio processor 120. Analog audio processor 115 is one example of the audio signal processor. Analog audio processor 115 is configured with an electronic circuit including an analog circuit, namely, one or a plurality of semiconductor integrated circuit(s). Analog audio processor 115 has an automatic level control (ALC) function. The automatic level control function is for automatically adjusting a gain such that a level of a digital audio signal to be output does not exceed a predetermined upper limit threshold regardless of a level of a received analog audio signal.

Digital image/audio processor 120 executes various processes on image information output from AFE 144 and an audio signal output from analog audio processor 115. For example, digital image/audio processor 120 performs gamma correction, white balance correction, flaw correction, a coding process, and the like on the image information in accordance with an instruction from controller 130. Further, digital image/audio processor 120 executes various processes on the audio signals in accordance with the instruction from controller 130. Digital image/audio processor 120 may be achieved by a hard-wired electronic circuit, or a microcomputer that executes a program, or the like. Digital image/audio processor 120 may be achieved as one semiconductor chip integrally with controller 130 or the like. For example, digital image/audio processor 120 can be configured with a device, such as a central processing unit (CPU), a field-programmable gate array (FPGA), an application specific integrated circuit (ASIC), a digital signal processor (DSP), or the like.

Digital image/audio processor 120 performs a computing process on an audio signal output from audio input unit 111, and performs a directivity synthesis process and a noise suppressing process. A circuit that achieves digital image/audio processor 120 may be integrated into one or a plurality of semiconductor integrated circuit(s).

Display unit 190 is disposed on a back face of digital camera 100. Display unit 190 can be configured with a liquid crystal display or an organic electro luminescence (EL) display. Display unit 190 displays an image based on the image information processed by digital image/audio processor 120.

Controller 130 integrally controls entire operation of digital camera 100. Controller 130 may be achieved by a hard-wired electronic circuit, or a microcomputer that performs a program, or the like. Further, controller 130 may be achieved as one semiconductor chip integrally with digital image/audio processor 120. Further, read only memory (ROM) 170 does not have to be present outside controller 130 (as a member separated from controller 130), and may be incorporated in controller 130. For example, controller 130 can be configured with a CPU, an FPGA, an ASIC, or a DSP.

ROM 170 stores programs relating to automatic focus control (AF control), automatic exposure control (AE control), and strobe light emission control to be made by controller 130, as wells as programs for generally controlling the entire operation of digital camera 100. ROM 170 stores various conditions and settings relating to digital camera 100. In the first exemplary embodiment, ROM 170 is a flash ROM.

Random access memory (RAM) 150 functions as work memories of digital image/audio processor 120 and controller 130. RAM 150 can be achieved by a synchronous dynamic random access memory (SDRAM) or a flash memory, for example. RAM 150 functions also as an internal memory in which image information and an audio signal are recorded.

External storage medium 160 is a memory device containing a nonvolatile storage cell such as a flash memory therein. External storage medium 160 is detachable from camera body 102. External storage medium 160 records image data and audio data to be processed by digital image/audio processor 120 in accordance with control of controller 130.

Operation unit 180 is a general name of an operation interface such as an operation button and an operation dial disposed on an exterior of digital camera 100. Operation unit 180 accepts an operation to be performed by a user. For example, operation unit 180 includes a release button, a power switch, and a mode dial provided to an upper face of digital camera 100, and includes a center button, a cross button, and a touch panel provided to a rear face of digital camera 100. When operation unit 180 receives an operation performed by a user, operation unit 180 informs controller 130 of various operation instruction signals.

Further, camera body 102 shifts CCD 143 in accordance with unsteadiness of camera body 102, and therefore reduces an influence of unsteadiness caused by camera shake in a captured image. As a configuration that achieves this function, camera body 102 includes body image stabilizer (BIS) driver 181 that moves CCD 143 based on the unsteadiness of camera body 102. BIS driver 181 includes a drive mechanism that is configured with, for example, a magnet and a flat coil. BIS driver 181 controls the drive mechanism based on signals from the gyro sensor and a position sensor, and shifts CCD 143 in a plane vertical to the optical axis such that the unsteadiness of camera body 102 is canceled.

1-1-4. Configuration of Microphones

Figure 2A:
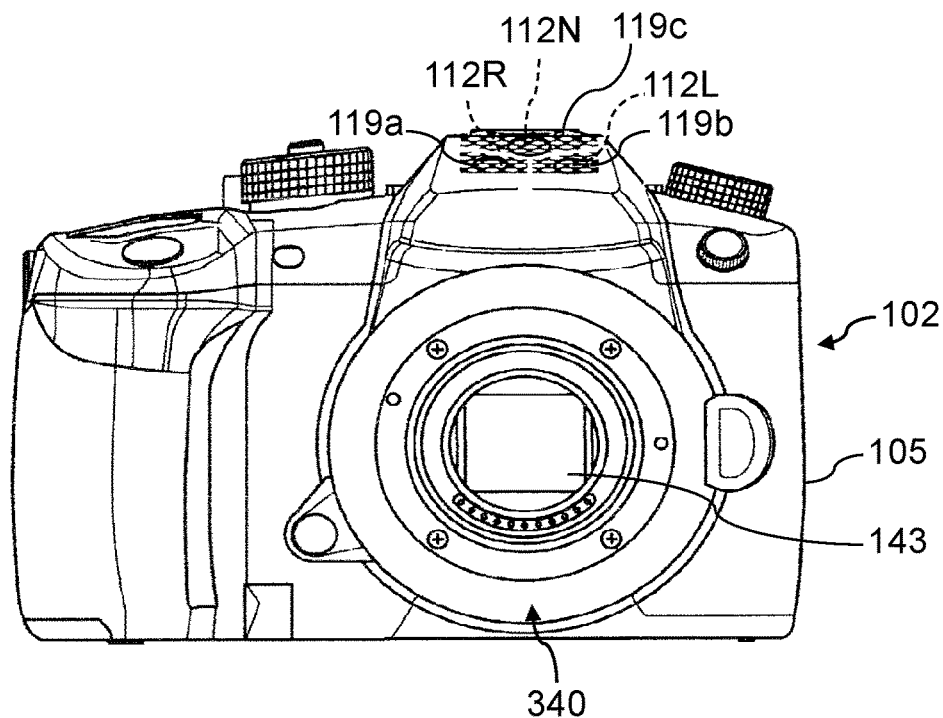
FIG. 2A is a front view of the imaging device of the present disclosure, and illustrates positions of punching metal plates.

Main microphone 111R, main microphone 111L, and reference microphone 111N are disposed inside camera body 102 as illustrated in FIG. 2A. Positions and detailed disposition of main microphone 111R, main microphone 111L, and reference microphone 111N in camera body 102 will be described in detail later.

A configuration of main microphone 111R will be described below. Since configurations of main microphone 111L and reference microphone 111N are similar to the configuration of main microphone 111R, description thereof will be omitted.

Figure 3:
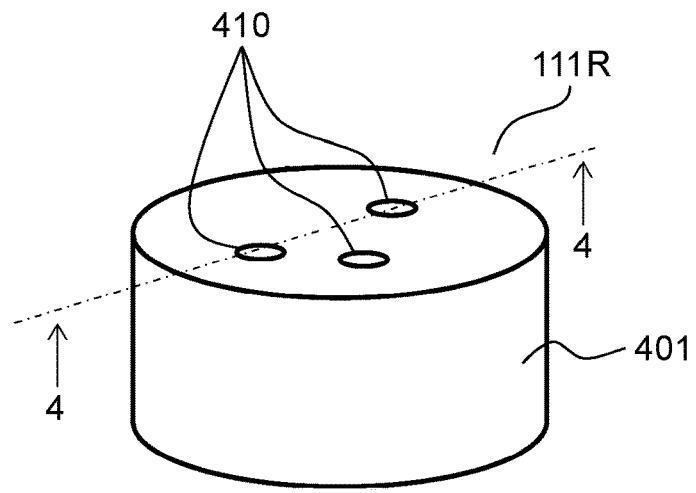
FIG. 3 is a perspective view illustrating a configuration of a main microphone of the present disclosure.
Figure 4:
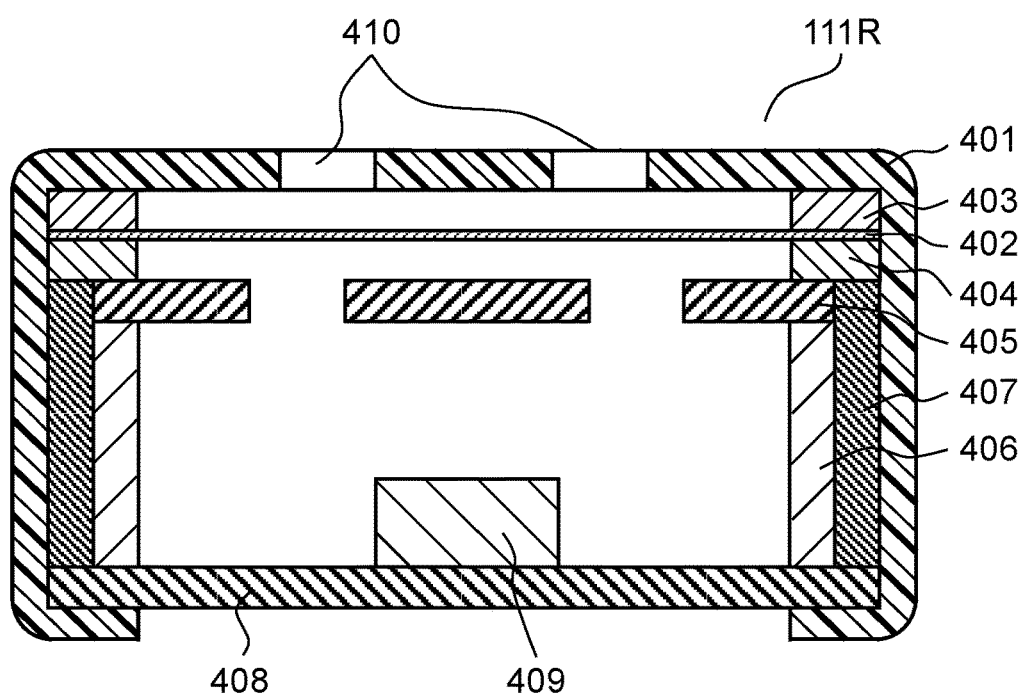
FIG. 4 is a diagram schematically illustrating a cross-section of the main microphone taken along line 4-4 of FIG. 3.

Main microphone 111R has a circular cylindrical shape as illustrated in FIG. 3. Main microphone 111R includes, as illustrated in FIG. 4, case 401, vibrating membrane 402, vibrating membrane ring 403, spacer 404, back polar plate 405, electrode 406, insulator 407, printed board 408, and field effect transistor (FET) 409.

Case 401 partially configures an exterior portion of main microphone 111R. Tone holes 410 are formed on a face on an opposite side to printed board 408, of case 401. A material of case 401 is metal. The material of case 401 is particularly steel use stainless (SUS) or aluminum.

Vibrating membrane 402 has a disc shape. Vibrating membrane 402 is formed by coating a surface of a thin film that has a thickness of about several microns to several dozen microns and is made of a polymeric material such as polyethylene terephthalate (PET) with metal such as gold or nickel through sputtering or vapor deposition. Vibrating membrane 402 is disposed inside case 401. Vibrating membrane 402 is bonded to ring-shaped vibrating membrane ring 403, and is braced like a membrane of a drum. A material of vibrating membrane ring 403 is metal, such as SUS or brass. Vibrating membrane 402 and vibrating membrane ring 403 each have an electric potential identical to an electric potential of case 401 through contact with case 401.

Spacer 404 has a ring shape. Spacer 404 has a thickness of about several microns to several dozen microns. A material of spacer 404 is an insulating substance such as polyimide.

Back polar plate 405 has a disk shape. Back polar plate 405 is obtained by coating a substrate of metal such as SUS or brass with an electret material such as tetrafluoroethylene-hexafluoropropylene copolymer (FEP). The electret material is a polymeric material that semi-permanently holds electric charges. As a result, back polar plate 405 holds electric charges. Back polar plate 405 has some holes for allowing air passes therethrough. Back polar plate 405 opposes vibrating membrane 402 via spacer 404. That is, a distance between back polar plate 405 and vibrating membrane 402 is approximately identical to a thickness of spacer 404.

Electrode 406 has, for example, a pipe shape, namely, a cylindrical shape. Electrode 406 is disposed between back polar plate 405 and printed board 408. Electrode 406 electrically connects back polar plate 405 with printed board 408.

Insulator 407 has, for example, a pipe shape. Insulator 407 is disposed between back polar plate 405 and case 401 and between electrode 406 and case 401. Insulator 407 prevents conduction of back polar plate 405 and electrode 406 with case 401.

Printed board 408 configures a part of the exterior portion of main microphone 111R. Printed board 408 is electrically connected to back polar plate 405 via electrode 406. Further, printed board 408 is surface-mounted with a chip part such as FET 409. A terminal (138 in FIG. 5) is provided to an outside of printed board 408, namely, a lower face in a sheet of FIG. 4. An electric output of main microphone 111R can be taken from this terminal.

Note that one end of case 401 is caulked from a lower side of printed board 408. That is, one end of case 401 is sealed without a gap between printed board 408 and case 401. Further, one end of case 401 electrically connects case 401 and printed board 408.

Operation of main microphone 111R, main microphone 111L, and reference microphone 111N will be described below.

A sound is a compressional wave of air, and is a pressure fluctuation of air. When a sound passes through tone holes 410 and reaches vibrating membrane 402, vibrating membrane 402 receives pressure. Vibrating membrane 402 displaces according to the pressure. That is, distance d between vibrating membrane 402 and back polar plate 405 changes. An amount of change is denoted by Δd. Further, an area of vibrating membrane 402 is denoted by S. Further, an amount of electric charges held by back polar plate 405 is denoted by Q. Vibrating membrane 402 and back polar plate 405 that oppose each other form a capacitor. When capacitance of the capacitor is denoted by C, and permittivity is denoted by ε, the following mathematical expression 1 holds.

[Mathematical Expression 1]

$$C = \varepsilon \frac{S}{d} \tag{1}$$

Further, when an electric potential formed between vibrating membrane 402 and back polar plate 405 is denoted by V, the following mathematical expression 2 holds in accordance with Coulomb's law.

[Mathematical Expression 2]

$$V = \frac{Q}{C} \tag{2}$$

In accordance with the mathematical expressions 1 and 2, the following mathematical expression 3 holds.

[Mathematical Expression 3]

$$V = \frac{Qd}{\varepsilon S} \tag{3}$$

When vibrating membrane 402 displaces due to a sound, and the distance between vibrating membrane 402 and back polar plate 405 changes by Δd, change of an electric potential ΔV is expressed by the following mathematical expression 4.

[Mathematical Expression 4]

$$\Delta V = \frac{Q\Delta d}{\varepsilon S} \tag{4}$$

The mathematical expression 4 indicates that a displacement of vibrating membrane 402 due to a sound can be taken as a change in an electric potential.

Capacitance C of a capacitor formed by vibrating membrane 402 and back polar plate 405 is several pF to a dozen pF, and its impedance is high. Therefore, FET 409 to be mounted to printed board 408 is used for converting this impedance.

1-1-5. Disposition of Microphone

Figure 2B:
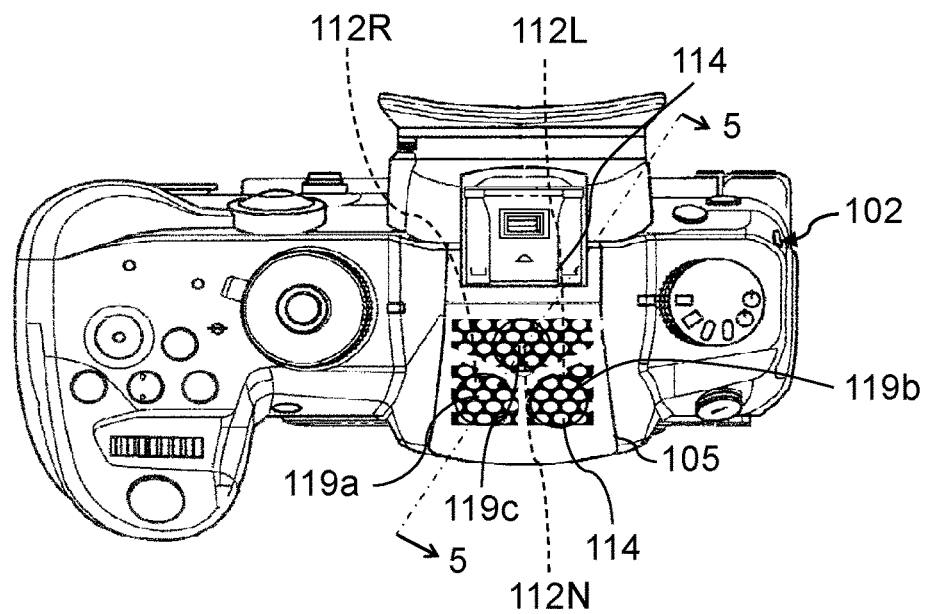
FIG. 2B is a top view of the imaging device of the present disclosure, and illustrates the positions of the punching metal plates.

FIG. 2A and FIG. 2B are diagrams illustrating positions of punching metal plates 119a, 119b, and 119c in digital camera 100. Punching metal plates 119a, 119b, and 119c are metal plates obtained by molding a plate-shaped metal material that has undergone a punching process (punching) through pressing. Punching metal plates 119a, 119b, and 119c each are provided with a lot of, namely, twenty or more tone holes 114. In the first exemplary embodiment, a number of tone holes is about 100. A diameter of each of tone holes 114 is a range from 0.3 mm to 1.0 mm inclusive. Therefore, digital camera 100 in the first exemplary embodiment is further suitable as digital cameras that are not dust-proof and drip-proof. Punching metal plates 119a, 119b, and 119c can be replaced by metal sheets obtained by molding sheet-shaped metal materials that have undergone a punching process through pressing, molded metal nets, or the like. Punching metal plates 119a, 119b, and 119c are fitted so as to cover resin-made case 105. In the first exemplary embodiment, punching metal plates 119a, 119b, and 119c as well as case 105 configure the housing having a porous exterior surface. Punching metal plates 119a, 119b, and 119c are curved, and are disposed obliquely with respect to a horizontal direction (left-right direction on a sheet of FIG. 2A) at a time of normal photography.

As illustrated in FIG. 2B, main microphone 111R is disposed below punching metal plate 119a. Further, main microphone 111L is disposed below punching metal plate 119b. Note that an area of punching metal plate 119a is larger than an area of vibrating membrane 402 of main microphone 111R. Therefore, punching metal plate 119a is disposed at not only a region opposing main microphone 111R but also an outer circumference of that region. In a case of dust-proof and drip-proof digital cameras, a number of tone holes on the housing is small, namely, is one or more through less than 10 for one main microphone, and in general the tone holes are disposed locally only above the main microphone. On the other hand, punching metal plate 119a in the first exemplary embodiment has a lot of tone holes 114 uniformly on the region opposing main microphone 111R and on the outer circumference of that region. Similarly, punching metal plate 119b has tone holes 114 uniformly on a region opposing main microphone 111L and an outer circumference of that region. In FIG. 2A and FIG. 2B, punching metal plate 119c is disposed also above reference microphone 111N, but punching metal plate 119c does not have to be disposed above reference microphone 111N. That is, a portion above reference microphone 111N may be sealed by case 105.

Main microphone 111R, main microphone 111L, and reference microphone 111N are disposed on an upper portion of camera body 102 inside camera body 102, namely, inside case 105. A region where main microphone 111R is disposed is within a region opposing punching metal plate 119a, and is within region 112R indicated by a dotted line. A region where main microphone 111L is disposed is a region opposing punching metal plate 119b, and is within region 112L. A region where reference microphone 111N is disposed is within a region opposing punching metal plate 119c, and is within region 112N.

Main microphone 111L and main microphone 111R are disposed side by side so as to be separated from each other by a predetermined distance in a longitudinal direction of camera body 102 (for example, about 15 mm). The longitudinal direction of camera body 102 is the left-right direction on the sheet of FIG. 2A.

Reference microphone 111N is disposed near main microphone 111R and main microphone 111L. Further, reference microphone 111N is disposed such that a distance between reference microphone 111N and main microphone 111R is equal to a distance between reference microphone 111N and main microphone 111L. As a result, use of one reference microphone 111N enables a noise suppressing process to be executed on main audio signals of left and right channels. Specifically, reference microphone 111N is disposed such that the distance between reference microphone 111N and main microphone 111R and the distance between reference microphone 111N and main microphone 111L are in a range from 5 mm to 50 mm, inclusive (for example, 10 mm).

Figure 5:
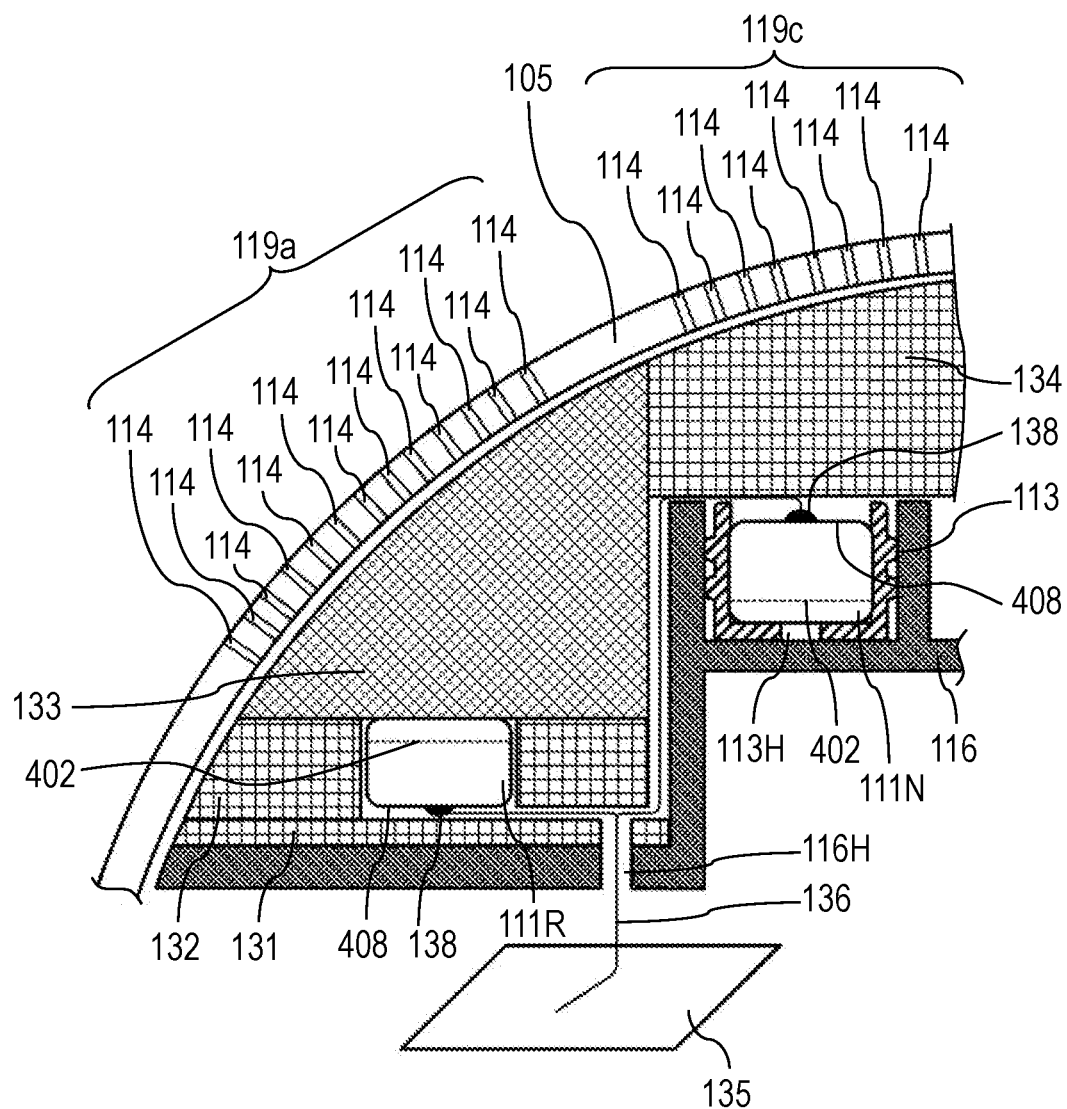
FIG. 5 is a diagram describing a disposition configuration of the main microphone and a reference microphone of the present disclosure.

FIG. 5 is a diagram describing a disposition configuration of main microphone 111R and reference microphone 111N inside camera body 102. FIG. 5 schematically illustrates a cross section taken along line 5-5 of FIG. 2B. FIG. 5 illustrates only main microphone 111R, but main microphone 111L is disposed similarly to main microphone 111R. In the first exemplary embodiment, main microphone 111R and main microphone 111L are disposed such that a surface of case 401 having tone holes 410 illustrated in FIG. 3 faces outside (an upper side on a sheet of FIG. 5), and printed board 408 faces inside camera body 102 (a lower side of the sheet in FIG. 5). Reference microphone 111N is disposed such that a surface of case 401 having tone holes 410 faces inside (the lower side on the sheet of FIG. 5) and printed board 408 faces outside camera body 102 (the upper side on the sheet of FIG. 5). That an orientation of reference microphone 111N is opposite to orientations of main microphone 111R and main microphone 111L means that a sound pickup orientation of reference microphone 111N is opposite to sound pickup orientations of main microphone 111R and main microphone 111L. That is, a sound pressure receiving orientation of vibrating membrane 402 of reference microphone 111N is opposite to sound pressure receiving orientations of vibrating membranes 402 of main microphone 111R and main microphone 111L.

Further, as illustrated in FIG. 5, resin case 116 is disposed inside case 105. Sponge A 131, sponge B 132, sponge C 133, and sponge D 134 are disposed inside case 105 so as to fill gaps formed by case 105, resin case 116, main microphones 111R, 111L, and reference microphone 111N, respectively.

Main microphone 111R is disposed on resin case 116 and on sponge A 131 provided on resin case 116. A space between an upper surface of main microphone 111R and a rear face of case 105 (a face opposing the inside of the digital camera) is filled with sponge C 133. Sponge C 133 enables sound pressure from the outside of case 105 to pass therethrough. An outer circumference face of main microphone 111R (a side face vertical to vibrating membrane 402 in the faces of case 401) is surrounded by sponge B 132. Sponge B 132 is provided with a cylinder-shaped hole such that cylinder-shaped main microphone 111R can be fitted into the hole.

Reference microphone 111N is disposed on a recessed portion formed by resin case 116 via rubber member 113.

Rubber member 113 has a cylindrical shape having an end face. The end face of rubber member 113 has opening 113H. However, opening 113H may not be provided. One end on an opposite side to the end face, of rubber member 113, is opened, and reference microphone 111N is inserted through the open end. In the first exemplary embodiment, the end face of rubber member 113 comes to a lower end of the sheet of FIG. 5. Therefore, a face on the lower side of reference microphone 111N is covered with the end face of rubber member 113. Further, a side face of reference microphone 111N is covered with a side face of rubber member 113. Reference microphone 111N is pressed into the recessed portion of resin case 116 by elastically deforming rubber member 113 (particularly a rib of rubber member 113) to be fixed into camera body 102. This makes it difficult for sound pressure entering from the gap between resin case 116 and reference microphone 111N to reach vibrating membrane 402 of reference microphone 111N. In order to fix reference microphone 111N to resin case 116, instead of rubber member 113, adhesive or clay may be used to fill the gap between resin case 116 and reference microphone 111N so that sound pressure is blocked.

Further, a space between an upper face of reference microphone 111N and the rear face of case 105 is filled with sponge D 134. Sponge D 134 can block sound pressure applied from the outside of case 105.

Figure 6A:
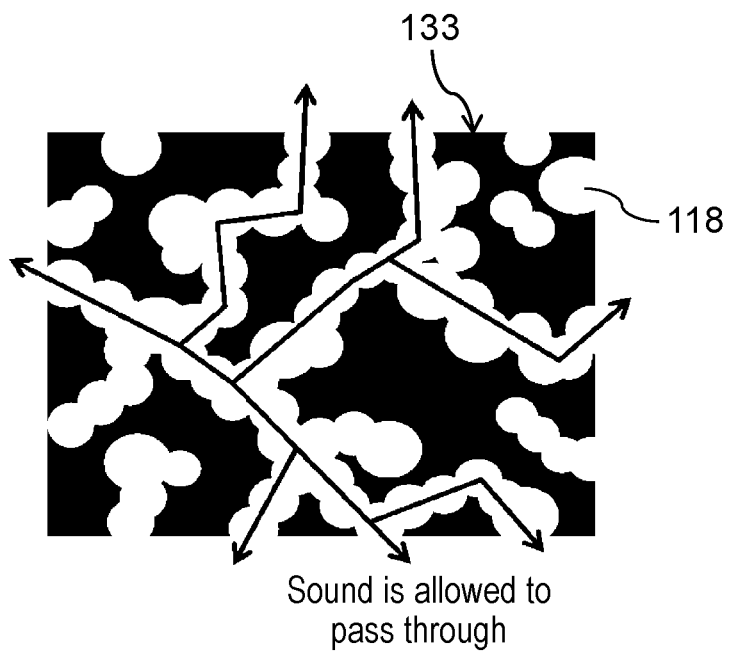
FIG. 6A is a pattern diagram illustrating a cross section of sponge C 133 in the imaging device of the present disclosure.
Figure 6B:
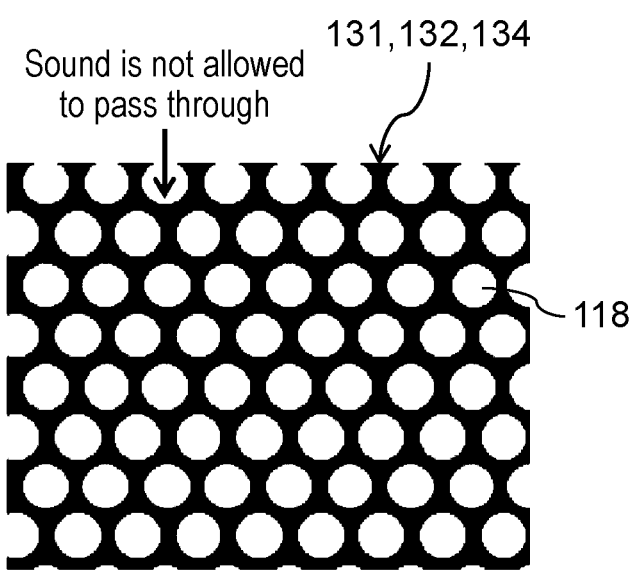
FIG. 6B is a pattern diagram illustrating a cross section of sponge D 134 in the imaging device of the present disclosure.

In the first exemplary embodiment, sponge A 131, sponge B 132, sponge C 133, and sponge D 134 are used as a filling member that fills gaps inside case 105, but a foam material such as foam plastic may be used instead. Further, sponge A 131, sponge B 132, sponge C 133, and sponge D 134 have bubble structures that are categorized into two main types. One of the types is sponge having interconnected cell structure typified by urethane foam as illustrated in FIG. 6A, and this sponge allows a sound to pass through a plurality of bubbles 118. That is, the sponge having the interconnected cell structure (one example of the filling member) has a lot of sound pressure transmitting pathways which pierces from one end to the other end. In the first exemplary embodiment, sponge having an interconnected cell structure is used as sponge C 133. The other one of the types is sponge having a closed cell structure typified by general-purpose polyethylene (PE) foam or rubber sponge as illustrated in FIG. 6B. Since bubbles 118 of sponge having the closed cell structure each are independent, the sponge having the closed cell structure is extremely smaller in the number of sound pressure transmitting pathways than sponge having the interconnected cell structure, and thus hardly allows a sound to substantially pass. The closed cell structure is used for sponge A 131, sponge B 132, and sponge D 134. However, the interconnected cell structure may be used for sponge A 131 and sponge B 132. Further, it is desirable that the closed cell structure is used for sponge D 134 when possible, but the interconnected cell structure may be used.

In such a manner, when sponge A 131 to sponge D 134, resin case 116, and rubber member 113 are disposed for main microphones 111R, 111L, and reference microphone 111N, in the first exemplary embodiment, resin case 116, sponge A 131, sponge B 132, and sponge C 133 correspond to a first support member of the present disclosure. Resin case 116, rubber member 113, and sponge D 134 correspond to a second support member of the present disclosure. Sponge C 133 corresponds also to the first filling member of the present disclosure. Sponge A 131 and sponge B 132 correspond also to the second filling member of the present disclosure.

Further, sound pressure transmitting pathways from the outside or the inside of digital camera 100 to vibrating membranes 402 of main microphones 111R, 111L will be described below. Sound pressure caused by audio from the outside of digital camera 100 (air vibration) is transmitted via the plurality of tone holes 114 of punching metal plate 119a, the plurality of bubbles 118 of sponge C 133, and tone holes 410 of main microphone 111R, to vibrating membrane 402 of main microphone 111R. Similarly, sound pressure caused by audio from the outside of digital camera 100 is transmitted via the plurality of tone holes 114 of punching metal plate 119b, the plurality of bubbles 118 of sponge C 133, and tone holes 410 of main microphone 111L, to vibrating membrane 402 of main microphone 111L.

In the first exemplary embodiment, as illustrated in FIG. 5, an inside space between vibrating membrane 402 of main microphone 111R and a center side of case 105 is blocked by printed board 408 of main microphone 111R, sponge A 131, sponge B 132, and resin case 116. Similarly, an inside of main microphone 111L and an inside at the center side of case 105 are blocked by resin case 116, sponge A 131, sponge B 132, and printed board 408 of main microphone 111L. That is, resin case 116, sponge A 131, sponge B 132, and printed board 408 make it difficult for sound pressure caused by a sound inside case 105 to be transmitted to vibrating membranes 402 of main microphones 111R, 111L.

Next, the sound pressure transmitting pathway from the outside and the inside of digital camera 100 to vibrating membrane 402 of reference microphone 111N will be described below. In the first exemplary embodiment, sound pressure from the outside digital camera 100 passes through tone holes 114 of punching metal plate 119c, but sponge D 134, rubber member 113, resin case 116, and printed board 408 of reference microphone 111N make it difficult for the sound pressure to be transmitted. Region 112N where reference microphone 111N is disposed does not have to be necessarily provided with tone holes 114 of punching metal plate 119c in case 105, and partial transmitting of the sound pressure from the outside of camera body 102 to the inside of reference microphone 111N may be blocked by case 105.

The inside of reference microphone 111N and the inside at the center side of case 105 are blocked by resin case 116 and rubber member 113.

As a result, in the first exemplary embodiment, as summarized in a list of FIG. 10, printed boards 408 of main microphones 111R, 111L, sponge A 131, sponge B 132, and resin case 116 correspond to the first blocking member of the present disclosure that blocks the sound pressure transmitting pathways. Sponge D 134, rubber member 113, resin case 116, and printed board 408 of reference microphone 111N correspond to the second blocking member of the present disclosure. Further, resin case 116 and rubber member 113 correspond to a third blocking member of the present disclosure.

Respective terminals 138 of printed boards 408 of main microphone 111R and main microphone 111L, and printed board 408 of reference microphone 111N are connected to printed circuit board (PCB) 135 via flexible printed circuit (FPC) 136 that passes through hole portion 11611.

1-2. Operation of Sound Pickup Device

A noise suppressing process for an audio signal in digital image/audio processor 120 of digital camera 100 will be described. Digital image/audio processor 120 executes the noise suppressing process based on a signal received from reference microphone 111N.

Main microphone 111R and main microphone 111L receive a main sound outside digital camera 100, and convert the main sound into an electric signal as a first audio signal (hereinafter, referred to as a "main audio signal"). Reference microphone 111N receives a noise inside digital camera 100, and converts the noise into an electric signal as a second audio signal (hereinafter, referred to as a "noise signal").

Analog audio processor 115 receives the main audio signals from main microphone 111R and main microphone 111L, receives the noise signal from reference microphone 111N, and executes a predetermined process on these signals to output the processed signals to digital image/audio processor 120. Digital image/audio processor 120 filters the noise signal to generate a noise component, and subtracts the noise component from the main audio signals. As a result, digital image/audio processor 120 generates the audio signals in which a noise is suppressed.

Figure 7:
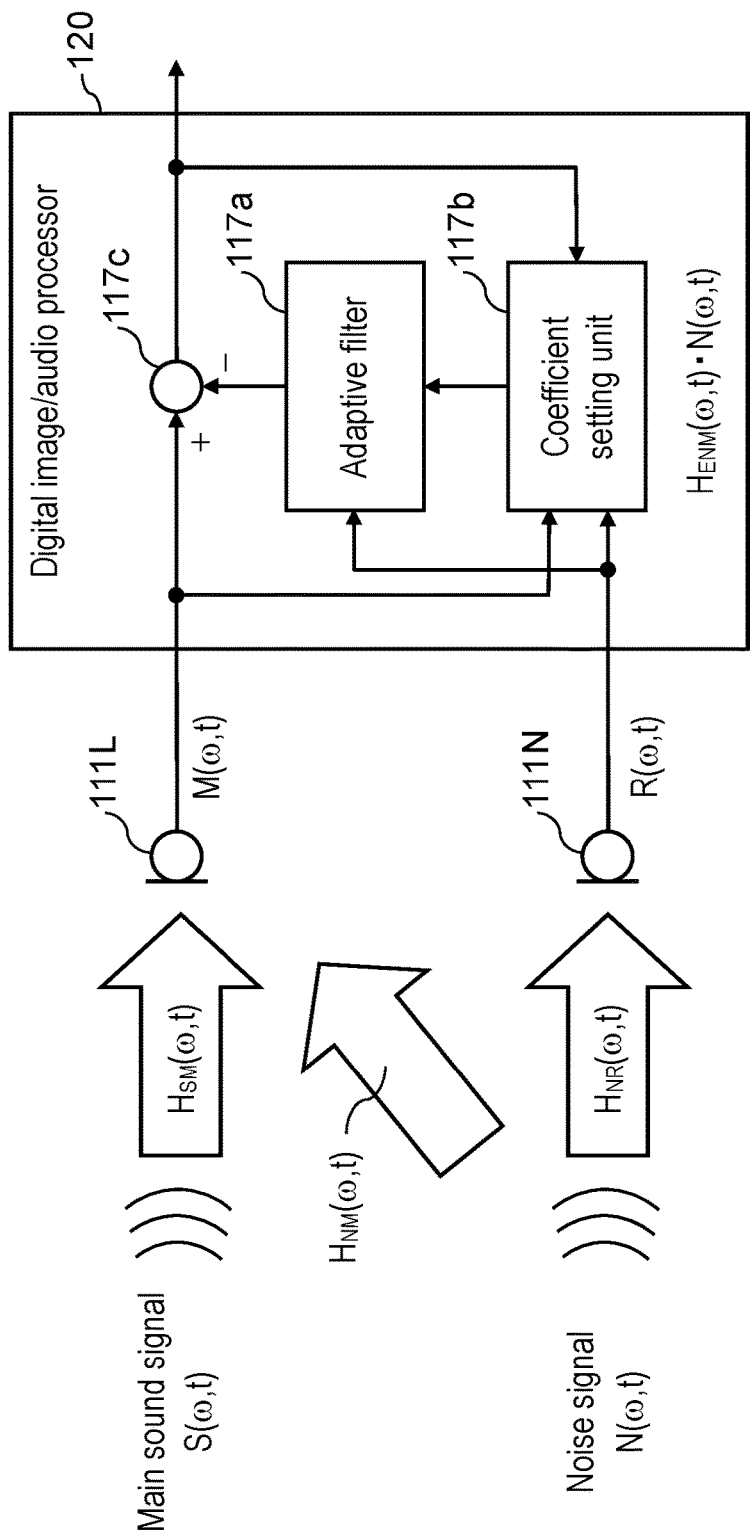
FIG. 7 is a diagram describing a configuration of a noise suppressing function in a digital image/audio processor.

FIG. 7 is a diagram illustrating a main configuration that achieves the noise suppressing process for an audio signal in digital image/audio processor 120. FIG. 7 illustrates, for convenience of the description, the configuration for an audio signal from one microphone (main microphone 111L) of two main microphone 111R and main microphone 111L on left and right sides. That is, digital image/audio processor 120 has the configuration illustrated in FIG. 7 for each channel. The configuration and operation relating to the noise suppression for the audio signal from the microphone (main microphone 111L) in one channel will be described below, but much the same is true on the microphone in the other channel (main microphone 111R).

Digital image/audio processor 120 includes adaptive filter 117a, coefficient setting unit 117b, and subtractor 117c.

Coefficient setting unit 117b sets a filter coefficient of adaptive filter 117a in accordance with a noise signal or the like. Adaptive filter 117a filters an output signal (noise signal) from reference microphone 111N in accordance with the filter coefficient set by coefficient setting unit 117b, and generates a noise component that is estimated to be included in an audio signal (main audio signal) picked up by main microphone 111L. Subtractor 117c subtracts the noise component, which is output from adaptive filter 117a, from the audio signal (main audio signal) picked up by main microphone 111L. As a result, the audio signal in which the noise is suppressed is generated.

In FIG. 7, a transfer function relating to the noise suppressing function in digital image/audio processor 120 is defined as follows. Main audio signals input by main microphone 111R and main microphone 111L are denoted by $S(\omega,t)$, and a noise signal input by reference microphone 111N is denoted by $N(\omega,t)$. The noise signal includes a signal of various noises caused in camera body 102. For example, a noise represented by the noise signal includes a drive sound of the drive mechanism that is caused when BIS driver 181 drives CCD 143.

Transfer functions for main audio signals $S(\omega,t)$ in main microphone 111R and main microphone 111L are denoted by $H_{SM}(\omega,t)$. Transfer functions for noise signals $N(\omega,t)$ in main microphone 111R and main microphone 111L are denoted by $H_{NM}(\omega,t)$. A transfer function for a noise signal $N(\omega,t)$ in reference microphone 111N is denoted by $H_{NR}(\omega,t)$. In this definition, output signals $M(\omega,t)$ of main microphone 111R and main microphone 111L, and output signal $R(\omega,t)$ of reference microphone 111N can be obtain in accordance with mathematical expression (5) and mathematical expression (6), respectively.

$$M(\omega,t)=H_{SM}(\omega,t)\bullet S(\omega,t)+H_{NM}(\omega,t)\bullet N(\omega,t) \quad \text{(Mathematical expression 5)}$$

$$R(\omega,t)=H_{NR}(\omega,t)\bullet N(\omega,t) \quad \text{(Mathematical expression 6)}$$

A signal component for a main audio signal included in output signal $R(\omega,t)$ of reference microphone 111N is assumed to be negligibly small.

In output signals $M(\omega,t)$ of main microphone 111R and main microphone 111L, a noise component is $H_{NM}(\omega,t)\bullet N(\omega,t)$. Therefore, the noise component $H_{NM}(\omega,t)\bullet N(\omega,t)$ is estimated and is subtracted from output signals $M(\omega,t)$, and thus audio signals in which a noise is suppressed can be obtained.

For this reason, in digital image/audio processor 120, coefficient setting unit 117b receives output signals $M(\omega,t)$ of main microphone 111R and main microphone 111L, and output signal $R(\omega,t)$ of reference microphone 111N, and compares these output signals to estimate a noise component and sets a filter coefficient of adaptive filter 117a in accordance with the estimated noise component ($H_{ENM}(\omega,t)\bullet N(\omega,t)$). Adaptive filter 117a generates a noise component ($H_{ENM}(\omega,t)\bullet N(\omega,t)$) from output signal $R(\omega,t)$ and outputs the noise component. Subtractor 117c subtracts output signal ($H_{ENM}(\omega,t)\bullet N(\omega,t)$) of adaptive filter 117a from output signals $M(\omega,t)$. As a result, the audio signal in which a noise is suppressed is output from analog audio processor 115.

1-3. Experimental Result

Figure 8:
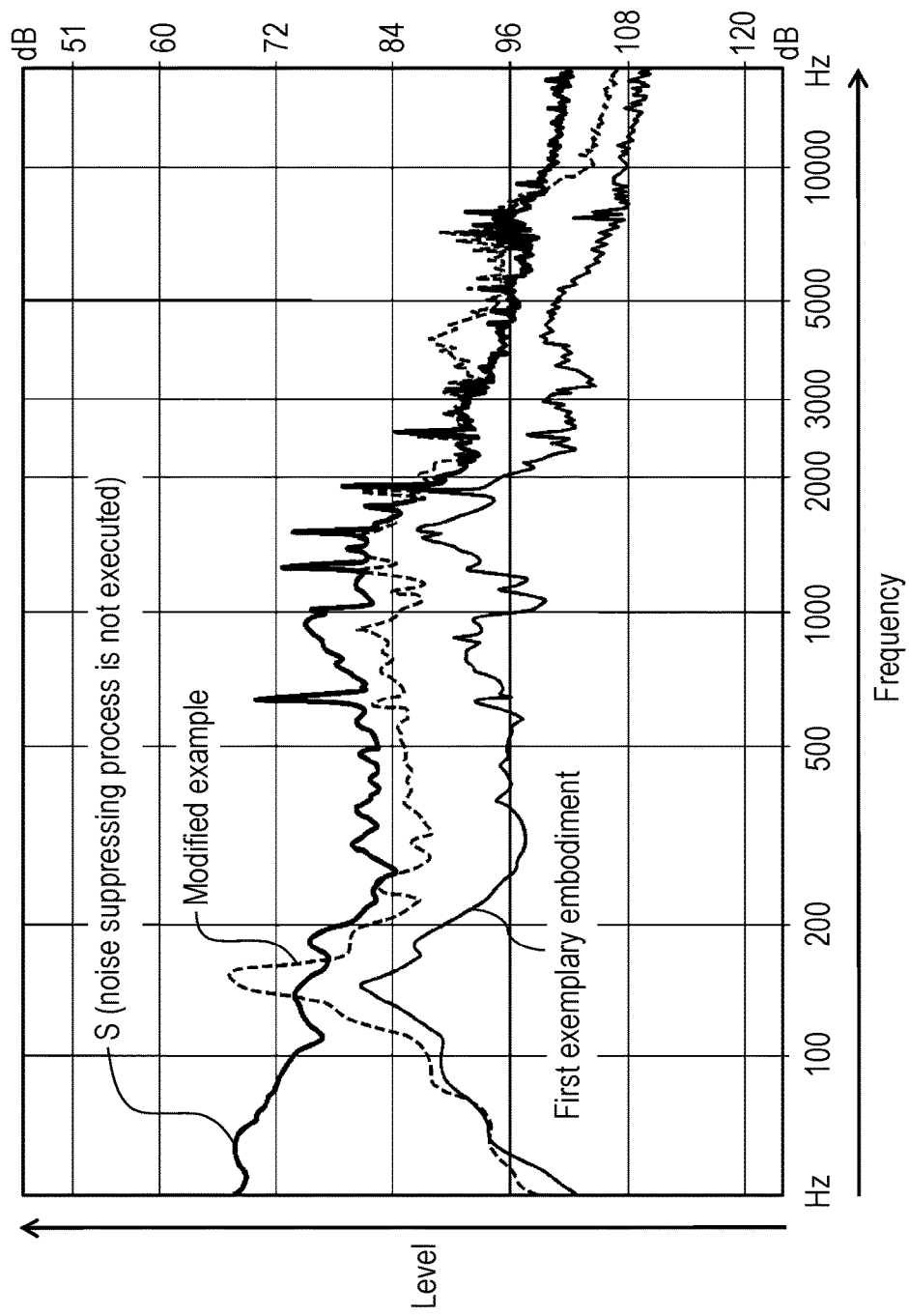
FIG. 8 is a diagram illustrating a measured result of a noise level in various disposition configurations of the reference microphone.

FIG. 8 is a diagram illustrating a measured result of a noise level in various disposition configurations of reference microphone 111N. A lateral axis in FIG. 8 represents a frequency (Hz) of an audio signal picked up by the sound pickup device, and a vertical axis represents a level (dB) of the audio signal.

In FIG. 8, a curved line S indicated by a thick line represents a waveform of each of audio signals picked up by main microphone 111R and main microphone 111L when digital image/audio processor 120 does not execute the above-described noise suppressing process.

In FIG. 8, a curved line indicated by a solid line (first exemplary embodiment) represents a waveform of an audio signal output from the sound pickup device in which main microphone 111R (main microphone 111L) and reference microphone 111N are disposed as illustrated in FIG. 5 as the first exemplary embodiment.

Figure 9:
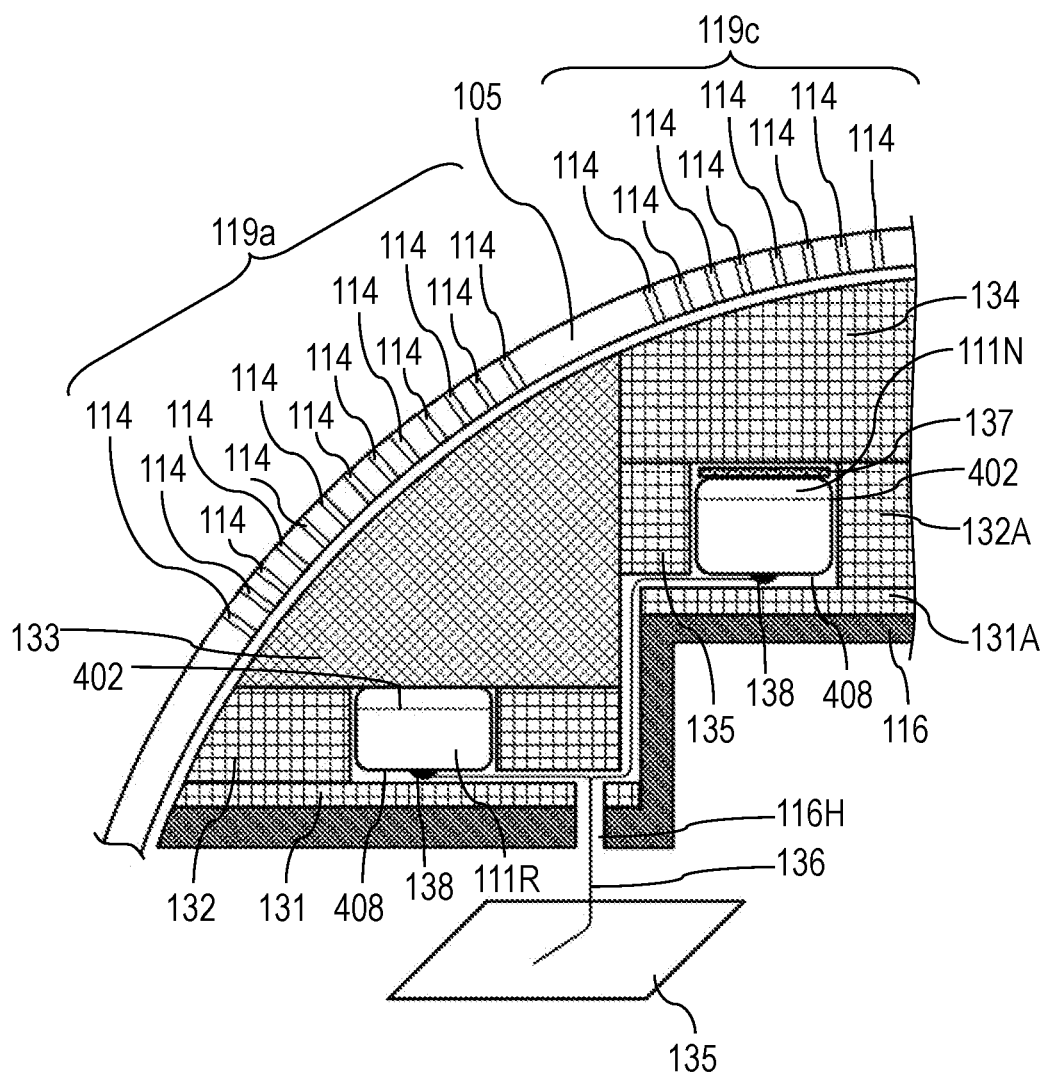
FIG. 9 is a diagram illustrating positions of the main microphone and the reference microphone in an imaging device of a modified example.

In FIG. 8, a curved line indicated by a broken line (modified example) represents a waveform of an audio signal output from the sound pickup device in which main microphone 111R (main microphone 111L) and reference microphone 111N are disposed as illustrated in FIG. 9.

In the modified example, the following changes are given to the disposition configuration of main microphone 111R (main microphone 111L) and reference microphone 111N illustrated in FIG. 5 in the first exemplary embodiment. Specifically, as illustrated in FIG. 9, main microphone 111R (main microphone 111L) and reference microphone 111N are disposed such that their orientations are identical to each other. That is, main microphone 111R (main microphone 111L) and reference microphone 111N are disposed such that printed boards 408 face the inside of digital camera 100 on inner portions with respect to vibrating membranes 402 (a lower side on a sheet of FIG. 9). Further, in the modified example, instead of rubber member 113 in FIG. 5, reference microphone 111N is fixed between resin case 116 and sponge D 134 by using sponge E 131A and sponge F 132A. That is, in the modified example, reference microphone 111N is disposed on resin case 116 via sponge E 131A, and a bottom face of reference microphone 111N is covered with sponge E 131A. Further, a cylindrical hole is provided on sponge F 132A such that cylindrical reference microphone 111N is fitted into the hole. Therefore, sponge F 132A is disposed so as to cover an outer circumferential face of reference microphone 111N (on a side face vertical to vibrating membrane 402 in the faces of case 401). Sponge E 131A is made of a material identical to the material of sponge A 131. Sponge F 132A is made of a material identical to the material of sponge B 132. In the modified example, tape 137 is attached so as to block tone holes 410 at an upper portion of reference microphone 111N. To wrap up, as shown in the list of FIG. 10, in the modified example, similarly to the first exemplary embodiment, resin case 116, sponge A 131, sponge B 132, and printed board 408 of main microphone 111R (main microphone 111L) correspond to the first blocking member of the present disclosure. In the modified example, partially differently from the first exemplary embodiment, sponge D 134 and tape 137 correspond to the second blocking member of the present disclosure. In the modified example, partially differently from the first exemplary embodiment, resin case 116, sponge E 131A, sponge F 132A, and printed board 408 of reference microphone 111N correspond to the third blocking member of the present disclosure.

Also in the modified example, similarly to the first exemplary embodiment, sponge A 131, sponge B 132, sponge C 133, and resin case 116 correspond to the first support member of the present disclosure. In the modified example, partially differently from the first exemplary embodiment, sponge D 134, sponge E 131A, sponge F 132A, and resin case 116 correspond to the second support member of the present disclosure. Further, also in the modified example, similarly to the first exemplary embodiment, sponge C 133 corresponds to the first filling member of the present disclosure. Also in the modified example, similarly to the first exemplary embodiment, sponge A 131 and sponge B 132 correspond to the second filling member of the present disclosure.

From a result shown in FIG. 8, in the first exemplary embodiment and the modified example, the noise suppressing effect is higher than that effect in a case where the noise process is not executed. Further, when the first exemplary embodiment is compared with the modified example, the noise suppressing effect is higher in the first exemplary embodiment. In the configuration in the modified example, a part of sound pressure externally received is considered to be transferred to vibrating membrane 402 via sponge D 134 and tape 137 as the second blocking member. That is, as the second blocking member for blocking transmission of sound pressure, it is considered that a member obtained by combining sponge D 134 with a comparatively thicker member, such as at least any one of resin case 116 and printed board 408 which does not have sound transmitting pathways (holes) is more effective than a thin member such as sticking tape.

1-4. Effects

Digital camera 100 (one example of the imaging device) in the first exemplary embodiment has a sound pickup device. The sound pickup device includes case 105 (housing) having a porous (a plurality of tone holes 114) exterior surface of punching metal plate 119, main microphone 111R and main microphone 111L that are disposed inside case 105, receive sound pressure from outside case 105 via the plurality of tone holes 114 and generate first audio signals, reference microphone 111N that is disposed near main microphone 111R and main microphone 111L inside case 105 and generates a second audio signal, a first support member that is provided in case 105 and supports main microphone 111R and main microphone 111L (resin case 116, sponge A 131, sponge B 132, and sponge C 133), a second support member that is provided in case 105 and supports reference microphone 111N (resin case 116 and rubber member 113), a first blocking member that blocks between the inside of case 105 and the insides of main microphone 111R and main microphone 111L (resin case 116, sponge A 131, sponge B 132, and printed board 408), a second blocking member that blocks between the outside of case 105 and the inside of reference microphone 111N (sponge D 134, printed board 408, rubber member 113, and resin case 116), and a third blocking member that blocks between the inside of case 105 and the inside of reference microphone 111N (resin case 116 and rubber member 113).

In the first exemplary embodiment, when the first blocking member, the second blocking member, and third blocking member are disposed, a noise caused inside digital camera 100 can be efficiently reduced from external main audio picked up by digital camera 100.

Further, even when main microphones 111R, 111L, and reference microphone 111N cannot be mounted to be enclosed in case 105, the first exemplary embodiment easily achieves the configuration such that reference microphone 111N can be disposed near main microphones 111R, 111L, and reference microphone 111N is blocked from sound pressure from the outside. Therefore, a noise generated inside digital camera 100 can be prevented from being mixed into an audio signal output from the sound pickup device. For example, in the first exemplary embodiment, resin case 116 is combined with sponge A 131 to sponge C 133 that are also the filling member as the first support member, and resin case 116 and rubber member 113 are used as the second support member. As a result, also when a housing having a porous exterior surface is used, main microphones 111R, 111L can be easily disposed near reference microphone 111N. When different materials are used between sponge C 133 and sponges A 131, B 132, and D 134, sponges A 131, B 132, and D 134 can be used as a part of the blocking member.

In the first exemplary embodiment, since punching metal plates 119a to 119c are used as the housing having the porous exterior surface (a part of the housing), porous molding is easy. Further, since materials of punching metal plates 119a to 119c are metal, they are robust and produce an electric shield effect.

In the first exemplary embodiment, use of sponges A 131, B 132, and C 133 as the first filling member or the second filling member enables the housing to be easily molded using a cutting die along a shape of a rear face of the housing, even when the rear face is a slanted face or a curved face. The combination of a plurality of sponges (for example, sponge A 131, sponge B 132, and sponge C 133) makes it possible to easily configure a filling member into a complicated shape. When porous sponge A 131, sponge B 132, and sponge D 134 that are lower in rigidity than resin case 116 and printed board 408 are used as a part of the first blocking member or the second blocking member, wind pressure can be absorbed and mixing of a noise can be suppressed.

Further, in the first exemplary embodiment, the exterior surface (for example, punching metal plate 119a, punching metal plate 119b, or punching metal plate 119c) is a slant face or a curved face. In the first exemplary embodiment, since the first support member and the second support member are provided, even if the exterior surface is a slant face or a curved face, the main microphones can be easily disposed near the reference microphone.

In the first exemplary embodiment, the first support member and the second support member are configured with members separable from a portion of the housing (case 105) having the exterior surface (punching metal plates 119a to 119c). Therefore, even if the exterior surface is a slant face or a curved face, main microphones 111R, 111L can be disposed near reference microphone 111N.

In the first exemplary embodiment, the first support member is configured by combining a member having a fixed shape (resin case 116) with a member that can be deformed in a compressed direction (for example, sponge C 133 as the first filling member, and sponge A 131 and sponge B 132 as the second filling member). As a result, main microphones 111R, 111L, and reference microphone 111N can be easily disposed inside the housing having the porous exterior surface into a desired layout. Further, even if the exterior surface of case 105 for digital camera 100 is a slant face or a curved face, main microphones 111R, 111L, and reference microphone 111N can be easily disposed into the desired layout.

Main microphones 111R, 111L in the first exemplary embodiment include a first main microphone that receives audio from a first direction (for example, main microphone 111R), and a second main microphone that receives audio from a second direction different from the first direction (for example, main microphone 111L). As a result, in the first exemplary embodiment, audio from more various directions can be picked up.

A distance between reference microphone 111N and the first main microphone (for example, main microphone 111R) in the first exemplary embodiment is equal to a distance between reference microphone 111N and the second main microphone (for example, main microphone 111L). As a result, in the first exemplary embodiment, a noise component can be suppressed for any audio signals from main microphones 111R, 111L.

Further, in the first exemplary embodiment, as illustrated in FIG. 5, at least a part of the second blocking member is an exterior portion of reference microphone 111N (printed board 408), and at least a part of the third blocking member is resin case 116. The disposition configuration is effective for a case where the orientations of main microphones 111R, 111L are desired to be set so as to be opposite to the orientation of reference microphone 111N, or a case where rubber member 113 having opening 113H is desired to be used, for example.

In the first exemplary embodiment, the first filling member (sponge C 133) is provided so as to fill the space between the surfaces of main microphones 111R, 111L and a rear face of case 105 and to allow sound pressure from the outside of case 105 to pass therethrough. As a result, the sound pressure from the outside can be transmitted to vibrating membranes 402 of main microphones 111R, 111L.

Further, in the first exemplary embodiment, at least a part of the first blocking member is a part of the first support member, and is the second filling member (sponge A 131 and sponge B 132) that is disposed on outer circumferences of main microphones 111R, 111L. As a result, a noise caused inside digital camera 100 can be blocked, and main microphones 111R, 111L can be easily disposed inside digital camera 100.

The sound pickup device in the first exemplary embodiment further includes an audio processor that obtains a noise component based on an audio signal form reference microphone 111N, and subtracts the noise component from main audio signals from main microphone 111R and main microphone 111L. As a result, the sound pickup device itself can suppress a noise component.

Other Exemplary Embodiments

As described above, the first exemplary embodiment has been described to exemplify a technique disclosed in the present application. However, the technique in the present disclosure is not limited to this, and can also be applied to an exemplary embodiment in which modification, replacement, addition, omission, or the like is performed appropriately. In addition, a new exemplary embodiment can be made by combining constituents described in the above first exemplary embodiment.

In the first exemplary embodiment, as illustrated in FIG. 2A and FIG. 2B, reference microphone 111N is disposed on a rearward side of the camera with respect to main microphone 111R and main microphone 111L, but reference microphone 111N may be disposed on a frontward side of the camera (a side close to a subject) with respect to main microphone 111R and main microphone 111L. Further, main microphone 111R, main microphone 111L, and reference microphone 111N are disposed on the upper portion of digital camera 100 (one example of electronic devices), but the positions of these microphones are not limited to this. For example, main microphone 111R, main microphone 111L, and reference microphone 111N may be disposed on at least one of a side face and a front face of digital camera 100.

In the above exemplary embodiment, reference microphone 111N is fixed to the recessed portion of resin case 116 via rubber member 113, but may be fixed to resin case 116 through another method. For example, reference microphone 111N may be fixed directly to resin case 116 by using adhesive.

The above exemplary embodiment has described the noise suppressing process for suppressing noises in main audio signals generated by main microphones 111R, 111L by using a noise signal generated by reference microphone 111N with reference to FIG. 7. However, the noise suppressing process is not limited to this, and thus various publicly-known methods can be applied.

In the first exemplary embodiment, the punching metal plate, the wire net, and the like have been illustrated as the housing (a part of the housing) having the porous exterior surface, but a member obtained by working a resin or carbon plate may be used as long as the plate can be molded into a porous shape.

In the first exemplary embodiment, the first support member is configured with resin case 116, sponge A 131, sponge B 132, and sponge C 133, but this configuration is only one example. For example, resin case 116 may be replaced by a metallic case. Further, for example, sponge A 131 and sponge B 132 may be integral sponge or integral rubber, for example. Alternatively, sponge A 131 or sponge B 132 may be further divided into a plurality of parts. In any cases, the member having a fixed shape such as resin case 116 is combined with a member that can be deformed in a compressed direction such as sponge A 131 to sponge C 133, and thus main microphones 111R, 111L can be easily fixed into an internal space of the housing having a complicated shape. Even if the first support member is configured only with a member having a fixed shape such as resin case 116, the first blocking member is separately disposed, and thus the noise suppressing effect can be produced.

In the first exemplary embodiment, the second support member is configured with resin case 116 and rubber member 113, but this configuration is only one example. For example, like the modified example of FIG. 9, resin case 116, sponge D 134, sponge E 131A, and sponge F 132A may configure the second support member. Further, sponge E 131A and sponge F 132A, or sponge F 132A and sponge D 134 may be integral sponge or integral rubber. Alternatively, sponge D 134 to sponge F 132A may be further divided into a plurality of parts. In any cases, a member having a fixed shape such as resin case 116 is combined with a member that can be deformed in a compressed direction such as sponge D 134 to sponge F 132A, and thus reference microphone 111N can be easily fixed into an internal space of the housing having a complicated shape The above exemplary embodiment has described an example in which the sound pickup device of the present disclosure is applied to the interchangeable lens type digital camera, but the sound pickup device of the present disclosure can be applied also to a digital camera in which a lens and a body are integral.

In the above exemplary embodiment, a digital camera that is not dust-proof and drip-proof is assumed as the digital camera, but when a fine porous shape can be provided to the exterior surface of the housing, a dust-proof and drip-proof digital camera may be used.

The above exemplary embodiment has described an example in which the sound pickup device of the present disclosure is applied to the digital camera, but the configuration of the sound pickup device of the present disclosure can be applied to other electronic devices. For example, the configuration of the sound pickup device of the present disclosure can be applied also to other electronic devices that receive audio (a video camera, an integrated circuit (IC) recorder, and the like). The configuration of the sound pickup device of the present disclosure is useful particularly for an electronic device containing a noise source therein.

As described above, the exemplary embodiments have been described to exemplify the technique disclosed in the present disclosure. For this reason, accompanying drawings and detail description are provided.

Therefore, the components described in the accompanying drawings and the detailed description include not only the components essential for solving the problem but also components that are not essential for solving the problem in order to illustrate the techniques. For this reason, even if these unessential components are described in the accompanying drawings and the detailed description, these unessential components should not be immediately approved as being essential.

Further, since the above exemplary embodiments illustrate the technique in the present disclosure, various modifications, substitutions, additions and omissions can be performed within the scope of claims and equivalent scope of claims.

The sound pickup device of the present disclosure can be applied to an electronic device that removes a noise component from a received audio signal to be capable of generating an audio signal in which a noise is suppressed, and converts audio into an electric signal to receive the electric signal (a video camera, an IC recorder), and is useful particularly for an electronic device containing a noise source therein.

What is claimed is:

1. A sound pickup device comprising:
   a housing having a porous exterior surface provided with a plurality of holes;
   a main microphone that receives sound pressure from an outside of the housing via the plurality of holes to generate a first audio signal, the main microphone being disposed on an inside of the housing;
   a reference microphone that generates a second audio signal from a noise generated by or within the housing, and is disposed near the main microphone on the inside of the housing;
   a first support member that supports the main microphone and is disposed on the inside of the housing;
   a second support member that supports the reference microphone and is disposed on the inside of the housing;
   a first blocking member that blocks all sound transmission path between the inside of the housing and an inside of the main microphone;
   a second blocking member that blocks all sound transmission path between the outside of the housing and an inside of the reference microphone; and
   a third blocking member that blocks all sound transmission path between the inside of the housing and the inside of the reference microphone; and
   a first filling member, provided under the plurality of holes, which fills a space between a surface of the main microphone and a rear face of the housing on an opposite side to the exterior surface, and passes sound pressure from the plurality of holes to the main microphone;
   wherein the first filling member has an interconnected cell structure.

2. The sound pickup device according to claim 1, wherein the exterior surface is a slant face or a curved face.

3. The sound pickup device according to claim 1, wherein at least a part of the second blocking member is an exterior portion of the reference microphone, and
   at least a part of the third blocking member is the second support member.

4. The sound pickup device according to claim 1, wherein the first filling member serves also as a part of the first support member.

5. The sound pickup device according to claim 1, further comprising
   a second filling member disposed on an outer circumference of the main microphone,
   wherein the second filling member serves also as at least a part of the first blocking member, and
   the second filling member serves also as a part of the first support member.

6. The sound pickup device according to claim 1, wherein the first support member and the second support member are configured with individual members separable from a portion, of the housing, which has the exterior surface.

7. The sound pickup device according to claim 1, wherein at least one of the first support member and the second support member is configured by combining a member having a fixed shape with a member that can be deformed in a compressed direction.

8. An imaging device comprising:
   an imaging unit that images a subject and generates an image signal;
   the sound pickup device according to claim 1 that generates a third audio signal based on the first audio signal and the second audio signal; and
   a controller that records the image signal as well as the third audio signal in a predetermined recording medium.

9. The sound pickup device according to claim 1 comprising,
   wherein each of the main microphone and the reference microphone includes:
   a case including a face on which a tone hole forms and including an opening on another face;
   a vibrating membrane disposed inside the case;
   a polar plate disposed inside the case, disposed so as to face to the vibrating membrane, and forms a capacitor with the vibrating membrane; and
   a printed board sealing the opening.

10. A sound pickup device comprising,
a housing having a porous exterior surface provided with a plurality of holes;
a main microphone that receives sound pressure from an outside of the housing via the plurality of holes to generate a first audio signal, the main microphone being disposed on an inside of the housing;
a reference microphone that generates a second audio signal from a noise generated by or within the housing, and is disposed near the main microphone on the inside of the housing;
a first support member that supports the main microphone and is disposed on the inside of the housing;
a second support member that supports the reference microphone and is disposed on the inside of the housing;
a first blocking member that blocks all sound transmission path between the inside of the housing and an inside of the main microphone;
a second blocking member that blocks all sound transmission path between the outside of the housing and an inside of the reference microphone; and
a third blocking member that blocks all sound transmission path between the inside of the housing and the inside of the reference microphone;
wherein each of the main microphone and the reference microphone includes:
a case including a face on which a tone hole forms and including an opening on another face;
a vibrating membrane disposed inside the case;
a polar plate disposed inside the case, disposed so as to face to the vibrating membrane, and forms a capacitor with the vibrating membrane; and
a printed board sealing the opening.

11. The sound pickup device according to claim 10, wherein the exterior surface is a slant face or a curved face.

12. The sound pickup device according to claim 10, wherein
at least a part of the second blocking member is an exterior portion of the reference microphone, and
at least a part of the third blocking member is the second support member.

13. The sound pickup device according to claim 10, further comprising
a first filling member that fills a space between a surface of the main microphone and a rear face of the housing on an opposite side to the exterior surface and allows the sound pressure from the outside of the housing to pass through,
wherein the first filling member serves also as a part of the first support member.

14. The sound pickup device according to claim 10, further comprising
a second filling member disposed on an outer circumference of the main microphone,
wherein the second filling member serves also as at least a part of the first blocking member, and
the second filling member serves also as a part of the first support member.

15. The sound pickup device according to claim 10, wherein the first support member and the second support member are configured with individual members separable from a portion, of the housing, which has the exterior surface.

16. The sound pickup device according to claim 10, wherein at least one of the first support member and the second support member is configured by combining a member having a fixed shape with a member that can be deformed in a compressed direction.

17. An imaging device comprising:
an imaging unit that images a subject and generates an image signal;
the sound pickup device according to claim 10 that generates a third audio signal based on the first audio signal and the second audio signal; and
a controller that records the image signal as well as the third audio signal in a predetermined recording medium.

18. A sound pickup device comprising:
a housing having a porous exterior surface provided with a plurality of holes;
a main microphone that receives sound pressure from an outside of the housing via the plurality of holes to generate a first audio signal, the main microphone being disposed on an inside of the housing;
a reference microphone that generates a second audio signal from a noise generated by or within the housing, and is disposed near the main microphone on the inside of the housing;
a first support member that supports the main microphone and is disposed on the inside of the housing;
a second support member that supports the reference microphone and is disposed on the inside of the housing;
a first blocking member that blocks all sound transmission path between the inside of the housing and an inside of the main microphone;
a second blocking member that blocks all sound transmission path between the outside of the housing and an inside of the reference microphone; and
a third blocking member that blocks all sound transmission path between the inside of the housing and the inside of the reference microphone;
wherein the main microphone and the reference microphone are arranged on a case disposed on the inside of the housing and having a stepped shape such that a vertical position of the main microphone and a vertical position of the reference microphone are different from each other.

19. The sound pickup device according to claim 18, wherein the exterior surface is a slant face or a curved face.

20. The sound pickup device according to claim 18, wherein
at least a part of the second blocking member is an exterior portion of the reference microphone, and
at least a part of the third blocking member is the second support member.

21. The sound pickup device according to claim 18, further comprising
a first filling member that fills a space between a surface of the main microphone and a rear face of the housing on an opposite side to the exterior surface and allows the sound pressure from the outside of the housing to pass through,
wherein the first filling member serves also as a part of the first support member.

22. The sound pickup device according to claim 18, further comprising
a second filling member disposed on an outer circumference of the main microphone,
wherein the second filling member serves also as at least a part of the first blocking member, and
the second filling member serves also as a part of the first support member.

23. The sound pickup device according to claim 18, wherein the first support member and the second support member are configured with individual members separable from a portion, of the housing, which has the exterior surface.

24. The sound pickup device according to claim 18, wherein at least one of the first support member and the second support member is configured by combining a member having a fixed shape with a member that can be deformed in a compressed direction.

25. An imaging device comprising:
- an imaging unit that images a subject and generates an image signal;
- the sound pickup device according to claim 18 that generates a third audio signal based on the first audio signal and the second audio signal; and a controller that records the image signal as well as the third audio signal in a predetermined recording medium.

* * * * *